Feb. 4, 1964 W. R. DICKIE 3,120,149
EXPLOSIVE SEPARABLE SEGMENTAL NUT INCLUDING KEY AND SPLINE MEANS
Filed July 27, 1959
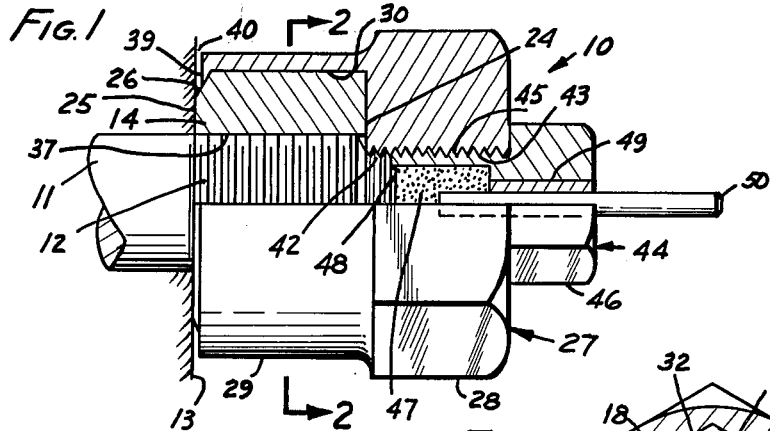
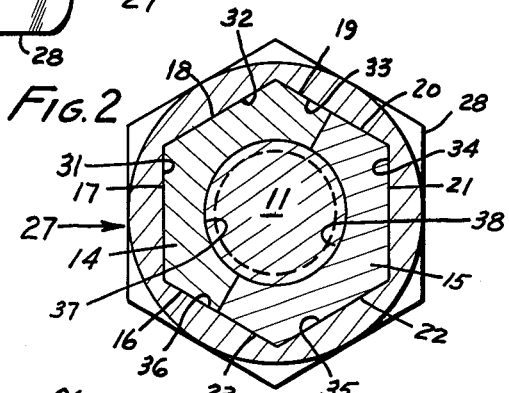
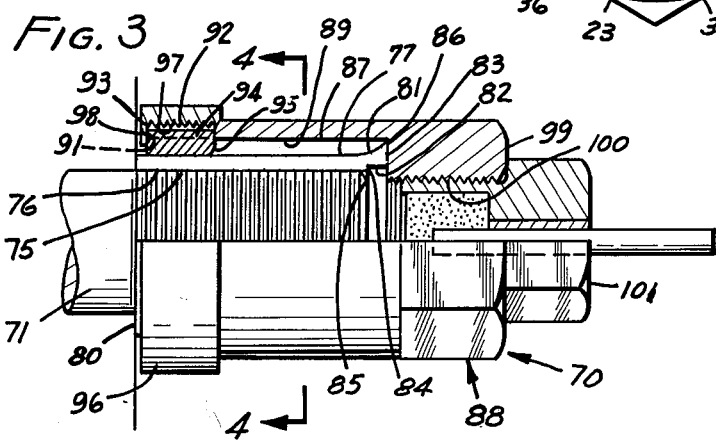
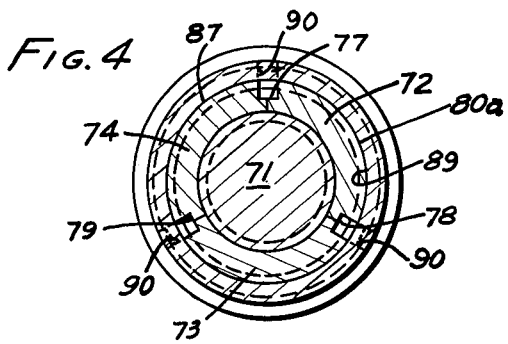
INVENTOR.
WILLIAM R. DICKIE
BY
Augus & Mou
ATTORNEYS.

United States Patent Office 3,120,149
Patented Feb. 4, 1964

3,120,149
EXPLOSIVE SEPARABLE SEGMENTAL NUT INCLUDING KEY AND SPLINE MEANS
William R. Dickie, Manhattan Beach, Calif., assignor to Hi-Shear Rivet Tool Company, Torrance, Calif., a corporation of California
Filed July 27, 1959, Ser. No. 829,674
4 Claims. (Cl. 85—33)

This invention relates to a separable nut of the explosive type.

An object of this invention is to provide a nut which can be turned onto a threaded shank to reliably and strongly engage therewith, and which can be relied on to become disengaged from the shank upon the firing of an explosive charge.

A related object is to attain the above reliability with a minimal explosive charge. In conventional explosively-separated fasteners, separation of the fastener ordinarily requires that some portion of the fastener be fractured. The force required to fracture a section is determined by many factors, many of which are not susceptible of close control in mass-production manufacture. The various properties contributing to the strength of the material, and the variation in cross-section area inherent in dimensional variations even when close-tolerance work is done, are but two examples of such factors. Accordingly, it has been customary to make the explosive charge sufficiently large that the force it generates will fracture the least-advantageous fastener, even though so large a charge is not needed for the particular specimen, or even for the greater proportion of like fasteners. It is undesirable to have these charges any larger than absolutely necessary, because of their effect on adjoining structure and equipment.

In the instant invention, only a small amount of material needs to be displaced, and none needs to be fractured. Only the relatively small amount of force needed to accomplish a small unstaking operation and to overcome sliding friction force, is required. The total force needed to separate the elements of this fastener is appreciably smaller than the force produced by the smallest practical explosive charge. Therefore the charge is minimal. This is in sharp contrast to conventional fasteners, wherein the fracture section is often load-bearing, and therefore strong, in which the forces required for fracture are of the same order as those produced by a practical charge, and in which the charge must be further increased to provide a safety factor so that the fastener will separate regardless of variations in the physical properties and dimensions of the fastener.

A nut according to this invention includes a plurality of nut segments which, when assembled in abutting relationship, form an internally threaded passage for receiving and engaging the threads on a shank. The segments are held assembled together by being fitted into a recess in the end of a retainer in torque transmitting engagement with the retainer. Yieldable retaining means hold the segments in the recess. An explosive charge is provided in the recess for removing the retainer from the segments by overcoming the retaining means, and firing the retainer away from the segments.

The invention will be fully understood from the following detailed description and the accompanying drawings, in which:

FIG. 1 is a side view, partly in cutaway cross-section;
FIG. 2 is a cross-section taken at line 2—2 of FIG. 1;
FIG. 3 is a side view, partly in cutaway cross-section, of the presently-preferred embodiment of the invention; and
FIG. 4 is a cross-section taken at line 4—4 of FIG. 3.

FIGS. 1 and 2 illustrate a separable nut 10 according to the invention which is intended to be threaded onto a shank 11 which has exterior threads 12. The shank may be part of any kind of body, for example, a bolt or a stud whose end projects beyond a body 13.

The separable nut includes a nut member comprising a pair of nut segments 14, 15. More than two segments may be provided, if desired, each segment being appropriately reduced in size. Segment 14 has exterior surfaces 16—19. Segment 15 has exterior surfaces 20—23. When the segments are assembled, surfaces 16—23 form an exterior hexagonal peripheral wall. The segments, when placed together, form a flat upper surface 24 and a flat lower surface 25. Surface 25 has a chamfer 26 at its outer edge.

A retainer 27 (sometimes called "retainer member") is provided which has an exterior wrenching section 28, and a tubular section 29. The tubular section has an interior recess 30 with hexagonal surfaces 31—36. Surfaces 31—36 make respective engagement with the following surfaces of the nut segments: 31—17; 32—18; 33—19, 20; 34—21; 35—22; and 36—16, 23. Wrenching torque applied to section 28 of the retainer is transmitted by tubular section 29 through the walls of its interior recess 30 to the nut segments. The engaging surfaces between the assembled nut and the inside of the retainer are non-circular, so they are in torque-transmitting relationship. In addition to the hexagonal shape shown, other shapes and schemes may be used, such as the splined devices of FIGS. 3 and 4.

Nut segments 14, 15 include interior threads 37, 38, respectively. When the nut segments are placed together, threads 37 and 38 form a continuous helical thread, so that the assembled nut segments can be turned onto thread 12 of the shank.

Yieldable retaining means are provided for holding the segments in recess 30. As shown in the drawings, the presently preferred form of retaining means comprises a staked-over lip 39 which may be continuous as shown, or may only be staked over at a few points. A clearance space 40 is provided between the outer end of the lip and the end surface 25 of the nut segment so that the end of the retainer will not bind against body 13.

The retainer has a second recess, which is shown as a port 42 through the retainer's head with interior threads 43. A squibb 44 with exterior threads 45 is threaded into port 42. Its inner end is preferably spaced from the interior end of recess 30. Thus, this leaves a chamber at the inner end of the recess when the nut is turned onto the shank, although this is not necessary. Head 46 of the squib is tightened against the head of the retainer, so that the squib is firmly held in the port. The squib includes an explosive charge 47 in an end opening 48 of the squib, so that the explosive charge will fire toward and against the end of shank 11. An insulating sleeve 49 passes through the head of the squib to insulate an electrode 50 from the head. Electrode 50 is buried in the explosive charge to act as one terminal for the squib. Head 46 can be used as the other electrode for the squib.

The presently preferred embodiment of the invention is shown in FIGS. 3 and 4. The principal differences between this embodiment and that of FIGS. 1 and 2 resides in the shape of the non-circular torque-transmitting engagement between the segments and the retainer, and in a means for camming the segments off of the shank threads when the fastener is separated.

FIG. 3 shows a separable nut 70 threaded to a shank 71. Nut segments 72, 73, 74 are in abutment to form a continuous structure which encloses a passage 75 with internal threads 76. Three splines 77, 78, 79 are formed in the outside of the assembled nut segments, each segment having an arcuate surface, such as surface 80a on segment 72. Each segment bears one-half of a spline at each of its longitudinal edges, the splines being formed up by placing the segments in abutment. The depth of the splines remains constant for a distance from end 80 of the segments, and then the spline becomes shallower. The bottom is concave outwardly at section 81.

A counterbore 82 is formed in the assembled segments, opening at end 83. The counterbore has a wall 84 which is disposed radially outward from threads 76. The junction 85 of the counterbore and the threaded passage is closer to end 80 than the junction 86 of the spline bottom with the outer wall 87 of the segments. An axial force on section 81 will tend to rotate the segments around junction 85 as a fulcrum, thereby providing a camming action.

A retainer 88 has a cylindrical-walled recess 89 with three key slots 90 at its open end 91. Exterior threads 92 are formed adjacent to end 93.

A key 94 is placed in each of slots 90, and the keys project into the splines, thus providing a non-circular, torque-transmitting engagement between the nut segments and the retainer. The keys have a rounded end 95 facing section 81 of the splines.

A cap 96 has interior threads 97 and an interior collar 98. The cap is threaded onto threads 92, and its collar overlaps the outer end (left-hand end in FIG. 3) of each of the keys, and also overlaps the radially outermost part of the segments. The left-hand end of the segments (as illustrated in FIG. 3) preferably projects axially beyond the left-hand end of the collar so that there will not be binding between the work and the collar when the nut is separated.

End 99 of the retainer has a wrench-engaging section, shown hexagonal in the drawings. The shape of the wrench-engaging section is arbitrary. It may be slotted, recessed, or have any desired torque-tool engaging configuration, instead of the hexagon.

A threaded port 100 through end 99 of the retainer receives a squib 101 of the type disclosed in FIGS. 1 and 2.

The operation of the device of FIGS. 1 and 2 should be evident from the drawings. When the the nut is assembled and the segments are retained in recess 30 by staking-over lip 39, the nut can simply be tightened down onto the end of the shank like any other nut. The nut can, of course, be removed conventionally by applying a wrench to section 28. Electric conductive means such as wires are connected to the electrodes of the squib.

When it is desired to remove the nut explosively, the squib is fired by the passage of current through the electrodes, which releases a charge of gases in the space between the squib and the head of the shank. This exerts a longitudinal separative force tending to blow the retainer to the right in FIG. 1 in opposition to the shank and the nut segments which are held to the shank by the engagement of threads 37 and 38 with threads 12. This force will unstake lip 39, and the retainer can then fly off. With the retainer removed, there is no binding constraint on the nut segments, and they can simply fall off the shank, thereby releasing the joint formed by the shank and nut.

The nut of FIGS. 3 and 4 is assembled by placing the segments and keys in the retainer, and screwing on the cap. The assembled nut is then installed like any conventional nut. The squib may be threaded into the retainer port either before or after the nut is installed.

To separate the nut explosively, the squib is fired, thereby injecting compressed gases into the space in the recess between the retainer and the shank. This tends to move the retainer as a "cylinder" relative to the segments as a "piston." A gas seal is made between the recess wall and wall 87 of the segments during the major portion of the retainer's movement along the segments. This confinement takes maximum advantage of the fluid pressure generated by the squib, and enables a squib of minimum size to be used. This feature is common to both illustrated embodiments.

The collar on the cap must be unstaked from the segments so that the retainer can move off. The collar has only minimum strength, because in use it does no more than to simply keep the segments from falling out of the retainer. Thus a very frail collar can be used as a yielding means, which requires only a small force to bend it so that the retainer can move.

The collar portions bearing on the keys do not yield at the same time as those which bear against the segments because the keys can slide until they reach section 81 of the splines. When the keys reach this section they stop, and the rest of the collar yields to the force exerted by the keys to permit the retainer to fly off.

The forces which cause the collar to yield and free the keys are derived from contact between the keys and section 81 of the splines. The force developed by this contact tends to rotate the segments around junction 85 as a fulcrum. This loosens the segment threads from the shank threads, and gives the segments a kick which assures that they will actually leave the shank, rather than be bound thereto by forces which were developed between the threads when the nut was tightened down on the shank.

The retainer continues its axial motion relative to the segments after the keys unstake the collar portion contiguous to them, and the retainer ultimately clears the segments. With the retainer removed, the nut segments are free, and the shank is no longer restrained by the nut.

When the segments are assembled, they substantially abut each other preferably throughout the length of the threaded passage 75 to form a substantially continuous structure. At their inner end, slots to enable the inner ends (right-hand ends in FIG. 3) of the segments to be kicked inwardly, although the amount of material lost by cutting an initially unitary nut into segments will usually be ample to allow the small movement desired. Inasmuch as the kick on the inner end of the segments is not necessary to the proper functioning of the nut, such slotting or spacing is entirely optional. Even without the kick by the keys, the segments will be released to fall off the shank.

The inner walls of recess 30 and the exterior surfaces 16—23 of the nut of FIGS. 1 and 2 make up prismatic shapes, forming regular hexagonal prisms, and the nut segments of FIGS. 3 and 4 make up an essentially cylindrical surface. It will be understood that they could instead form pyramidal or tapered shapes, tapering toward a smaller end at the head of the retainer than at the retainer recess opening. This would avoid substantial sliding friction between the wall of recess 30 and the exterior peripheral surfaces of the nut segments, but would give up the advantage of the complete enclosure of the explosion products until the retainer is completely removed which is obtained when the prismatic shapes shown in the drawings are used.

Attention is called to a safety feature of this invention. In contrast to fasteners which rely on fracturing sections of nuts and shanks, wherein the charge is ordinarily buried in the device, the device being always armed, this invention provides a nut which can be installed unarmed, and the charge attached the last thing. Explosive ordnance is preferably not handled in a factory building. It is preferred to handle it only in protected installations. The convenience of this device is evident: it can be installed without any precautions whatever, and can be armed whenever it is safe and convenient to do so.

This nut provides a simple construction for a separable nut which is inexpensive to manufacture and reliable in operation.

The term "yielding" as used herein in connection with the retaining means, is intended in its broadest sense. While in the preferred embodiment of the invention it is only necessary to unbend staked lip 39, it is to be understood that "yielding" is not limited merely to bending of a lip shape, but comprehends any retaining means which can be overcome by the explosive charge of the squib. This includes fracture of the retainer or cap, or their plastic deformation, or spring retainer means, or any other means which allows the retainer to move axially away from the retainer after a force of sufficient magnitude is exerted on the retainer. Thus, the term "yielding" as used herein, comprehends any means whatever used to hold the retainer and segments against axial separation which can be overcome by the explosive charge of the squib.

In both embodiments, only a small force is needed to unstake, or bend, the collar or lip out of the way to let the retainer move along the segments. Thereafter, the force of friction developed between the segments and the retainer needs to be overcome, but this is small. In the device of FIGS. 1 and 2, these are all the forces to be overcome on separation. The additional force needed to move the retainer axially past section 81 in FIGS. 3 and 4 is also quite small. In both embodiments, the total force required is well within that provided by a small charge on the order of two grains of gunpowder for a ½ inch diameter fastener of the type shown in FIGS. 3 and 4, still providing an adequate factor of safety. Furthermore, the only variable which needs to be controlled is the force needed to overcome the yielding means. This is susceptible of reasonably close control, at least close enough to keep the force required well within that provided by a minimal charge.

This invention is not to be limited by the embodiments shown in the drawings and described in the description, which are given by way of example and not of limitation, but only in accordance with the scope of the appended claims.

I claim:

1. A separable nut with an axis, comprising a plurality of nut segments shaped to fit together so as to form an exterior surface and an internally threaded passage, a retainer having a recess opening at one end of the retainer and having an inner wall within which said segments are fitted to be held together, key and spline means keying the retainer and segments together in torque-transmitting and axially-slideable relationship with each other, said key and spline means comprising a key engaged in a slot in the retainer and in a spline in the segments, the splines diminishing in depth toward the inner end of the recess so as to have a tapered bottom, and in which a counterbore is provided in the assembled segments to form a fulcrum axially adjacent to the tapered bottom, whereby the keys tend to force the segment threads away from the shank when the retainer is fired off the segments, a cap attached to the retainer, a yieldable collar on said cap overhanging at least part of each key and of each segment, and an explosive in fluid communication with said recess and adapted to fire gaseous products of explosion between the retainer and the segments for overcoming the yieldable collar and firing the retainer off the segments so they can separate from the threads of a shank onto which they were threaded, which shank formed a fluid seal at the segment threads.

2. A separable nut with an axis, comprising a plurality of nut segment members shaped to fit together and form an exterior surface and an internally threaded passage, a retainer member having a recess opening at one end of the retainer member and having an inner wall within which said segments are fitted to be held together in relatively non-rotational relationship, key and spline means carried by said member comprising a key and a spline set for each of said nut segment members, the key of each set being on one member and the spline being on the other member, the splines extending axially, and the key extending into the spline, the splines diminishing in depth in the direction toward which the key travels when the nut segment member is removed from the retainer member, the splines thereby having a tapered bottom, a yieldable collar attached to the retainer member and radially overhanging at least a part of each key and of each segment member, and an explosive in fluid communication with said recess and adapted to fire gaseous products of explosion between the retainer member and the segment members for overcoming the yieldable collar and firing the retainer member off the segment members so the latter can separate from the threads of a shank onto which they were threaded, which shank formed a fluid seal at the threads on the nut segments, and a counterbore provided in the segments to form a fulcrum remote from said one end and facing the axis, whereby the keys tend to force the segment threads away from the shank when the retainer is fired off of the segments by virtue of contact between the diminished depth portion of the splines and the keys.

3. A nut according to claim 1 in which a port extends through the retainer in fluid communication with the space in the recess between the retainer and segments for receiving the explosive.

4. A nut according to claim 3 in which the port is threaded, and the explosive charge is a squib threaded into the port.

References Cited in the file of this patent

UNITED STATES PATENTS

| | | |
|---|---|---|
| 1,276,785 | McGinnis | Aug. 27, 1918 |
| 1,909,601 | Young | May 16, 1933 |
| 2,421,807 | Richey | June 10, 1947 |
| 2,432,941 | Scott | Dec. 16, 1947 |
| 2,858,726 | Robinson | Nov. 4, 1958 |

FOREIGN PATENTS

| | | |
|---|---|---|
| 558,302 | Great Britain | Dec. 30, 1943 |

UNITED STATES PATENT OFFICE
CERTIFICATE OF CORRECTION

Patent No. 3,120,149                                      February 4, 1964

William R. Dickie

It is hereby certified that error appears in the above numbered patent requiring correction and that the said Letters Patent should read as corrected below.

Column 1, line 71, for "across-section" read -- a cross-section --; column 3, line 27, for "end" read -- ends --; line 28, for "projects" read -- project --; column 4, line 34, after "slots" insert -- may be provided if desired, --.

Signed and sealed this 28th day of July 1964.

(SEAL)

Attest:

ESTON G. JOHNSON                                      EDWARD J. BRENNER
Attesting Officer                                          Commissioner of Patents